US006279032B1

(12) United States Patent
Short et al.

(10) Patent No.: US 6,279,032 B1
(45) Date of Patent: Aug. 21, 2001

(54) METHOD AND SYSTEM FOR QUORUM RESOURCE ARBITRATION IN A SERVER CLUSTER

(75) Inventors: Robert T. Short, Kirkland; Rod Gamache, Issaquah; Michael T. Massa; John D. Vert, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/963,050

(22) Filed: Nov. 3, 1997

(51) Int. Cl.[7] .................................................. G06F 15/16
(52) U.S. Cl. .......................... 709/209; 709/208; 709/215; 709/312; 714/8
(58) Field of Search ..................................... 709/209, 208, 709/210, 211, 215, 212, 312; 714/1, 25, 6, 2, 8, 51, 15; 710/200, 220, 240, 241, 242, 243, 244, 110; 713/2; 707/10; 700/3; 712/12; 711/147, 129

(56) References Cited

U.S. PATENT DOCUMENTS

| | | | |
|---|---|---|---|
| 5,280,627 | 1/1994 | Flaherty et al. ........................ 713/2 |
| 5,553,239 | * 9/1996 | Heath et al. ......................... 713/201 |
| 5,659,748 | 8/1997 | Kennedy ................................. 713/2 |
| 5,673,384 | * 9/1997 | Hepner et al. ........................ 714/6 |
| 5,727,206 | * 3/1998 | Fish et al. .......................... 707/202 |
| 5,754,821 | * 5/1998 | Cripe et al. ......................... 711/164 |
| 5,781,910 | * 7/1998 | Gostanian et al. ................... 707/201 |
| 5,828,876 | * 10/1998 | Fish et al. ............................. 707/1 |
| 5,828,889 | * 10/1998 | Moiin et al. ......................... 710/240 |
| 5,892,913 | 4/1999 | Adiga et al. ......................... 709/219 |
| 5,893,086 | * 4/1999 | Schmuck et al. ....................... 707/1 |
| 5,909,540 | * 6/1999 | Carter et al. ........................... 714/4 |
| 5,917,998 | * 6/1999 | Cabrera et al. ......................... 714/6 |
| 5,918,229 | 6/1999 | Davis et al. .......................... 707/10 |
| 5,940,838 | * 8/1999 | Schmuck et al. ..................... 707/200 |
| 5,946,686 | * 8/1999 | Schmuck et al. ...................... 707/10 |
| 5,948,109 | * 9/1999 | Moiin et al. ............................. 714/4 |
| 5,996,075 | * 11/1999 | Matena ................................. 713/220 |
| 5,999,712 | * 12/1999 | Moiin et al. ......................... 709/230 |
| 6,014,669 | * 1/2000 | Slaughter et al. ..................... 707/10 |

FOREIGN PATENT DOCUMENTS 0 760 503   3/1997  (EP) .
0 887 731  12/1998  (EP) .

OTHER PUBLICATIONS

Carr, Richard, "The Tandem Global Update Protocol," *Tandem Systems Review*, vol. 1, No. 2, 74–85 (1985).
Lamport, Leslie, *A Fast Mutual Exclusion Algorithm*, Digital Equipment Corporation, Oct. 31, 1986.
Lamport, Leslie, *The Part–Time parliament*, Digital Equipment Corporation, Sep. 1, 1989.

* cited by examiner

*Primary Examiner*—Robert B. Harrell
*Assistant Examiner*—William C. Vaughn, Jr.
(74) *Attorney, Agent, or Firm*—Michalik & Wylie, PLLC

(57) ABSTRACT

A method and system for selecting a set of systems (nodes) for a server cluster from at least two non-communicating sets of systems. A persistent storage device with cluster configuration information therein is provided as a quorum resource. Using an arbitration process, only one system exclusively reserves the quorum resource. The set with the system therein having the exclusive reservation of the quorum device is selected as the cluster. The arbitration process provides a challenge-defense protocol whereby a system can obtain the reservation of the quorum device when the system that has the reservation fails.

71 Claims, 7 Drawing Sheets

METHOD AND SYSTEM FOR QUORUM RESOURCE ARBITRATION IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be quickly restarted on a surviving server, with no substantial reduction in service. Indeed, clients of a Windows NT cluster believe they are connecting with a physical system, but are actually connecting to a service which may be provided by one of several systems. To this end, clients create a TCP/IP session with a service in the cluster using a known IP address. This address appears to the cluster software as a resource in the same group (i.e., a collection of resources managed as a single unit) as the application providing the service. In the event of a failure the cluster service "moves" the entire group to another system.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

While clustering is thus desirable for many applications, problems arise when the systems in a cluster stop communicating with one another, known as a partition. This typically occurs, for example, when there is a break in the communications link between systems or when one of the systems crashes. When partitioned, the systems may separate into two or more distinct member sets, with systems in each member set communicating among themselves, but with no members of either set communicating with members of any other sets. Thus, a first problem is determining how to handle the split. One proposed solution is to allow each member set to continue as its own, independent cluster. However, one main difficulty with this approach is that the configuration data (i.e., state of the cluster) that is shared by all cluster members and which is critical to cluster operation may become different in each of the multiple clusters. To subsequently reunite the sets into a common cluster presumes that reconciliation of the data may later take place, however such reconciliation has been found to be an extremely complex and undesirable undertaking.

A simpler solution is to allow only one set to survive and continue as the cluster, however this requires that some determination be made as to which set to select. The known way to make this determination is based on determining which set, if any, has a simple majority of the total systems possible therein, since there can be only one such system.

However, if a cluster shuts down and a new cluster is later formed with no members common to the previous cluster, known as a temporal partition, a problem exists because no new member possesses the state information of the previous cluster. Thus, in addition to deciding representation by which cluster has the most systems, the majority solution further requires that more than half of the total possible systems in a cluster (i.e., a quorum) are communicating within a single member set. This ensures that at least one system is common to any permutation of systems that forms a cluster, thereby guaranteeing that the state of the cluster is persisted across the temporal partition as new clusters having different permutations of systems form from time to time.

A problem with the simple majority/quorum solution is that there is no surviving cluster unless more than half of the systems are operational in a single member set. As a result, a minority member set that otherwise would be capable of operating as a cluster to adequately service clients is not allowed to do so. A related problem arises when forming a cluster for the first time after a total system outage. Upon restart, no one system can form a cluster and allow other systems to join it over time because by itself, that system cannot constitute a quorum. Consequently, intervention by an administrator or a special programmatic process is required to restart the cluster.

SUMMARY OF THE INVENTION

Accordingly, the present invention provides an improved method and system for determining which member set of a partitioned cluster should survive to represent the cluster. The system and method of the present invention allows a minority of a partitioned cluster's systems to survive and operate as the cluster. An arbitration method and system is provided that enables partitioned systems, including those in minority member sets, to challenge for representation of the cluster, and enables the automatic switching of cluster representation from a failed system to an operational system. Temporal partitions are handled, and a single system may form a quorum upon restart from a total cluster outage. The method and system is flexible, extensible and provides for a straightforward implementation into server clusters.

Briefly, the present invention provides a method and system for selecting one set of systems for a cluster from at least two partitioned sets of systems. A persistent storage device with cluster configuration information therein is provided as a quorum resource. Using an arbitration process, one system exclusively reserves the quorum resource. The set with the system therein having the exclusive reservation of the quorum device is selected as the cluster. The arbitration process provides a challenge-defense protocol whereby a system can obtain the reservation of the quorum device when the system that has the reservation fails.

The arbitration process, executed by a partitioned system, first requests exclusive ownership of the quorum device. If the request is successful, that system's set is selected as the cluster. If the request is not successful, the arbitration process breaks another system's exclusive ownership of the quorum resource, delays for a predetermined period of time, and requests in a second request the exclusive ownership by the first system. If the second request is successful, the process selects as the cluster the set with the first system therein. During the time delay, if operational, the other system persists its reservation of the quorum resource whereby the first system's second request will fail.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
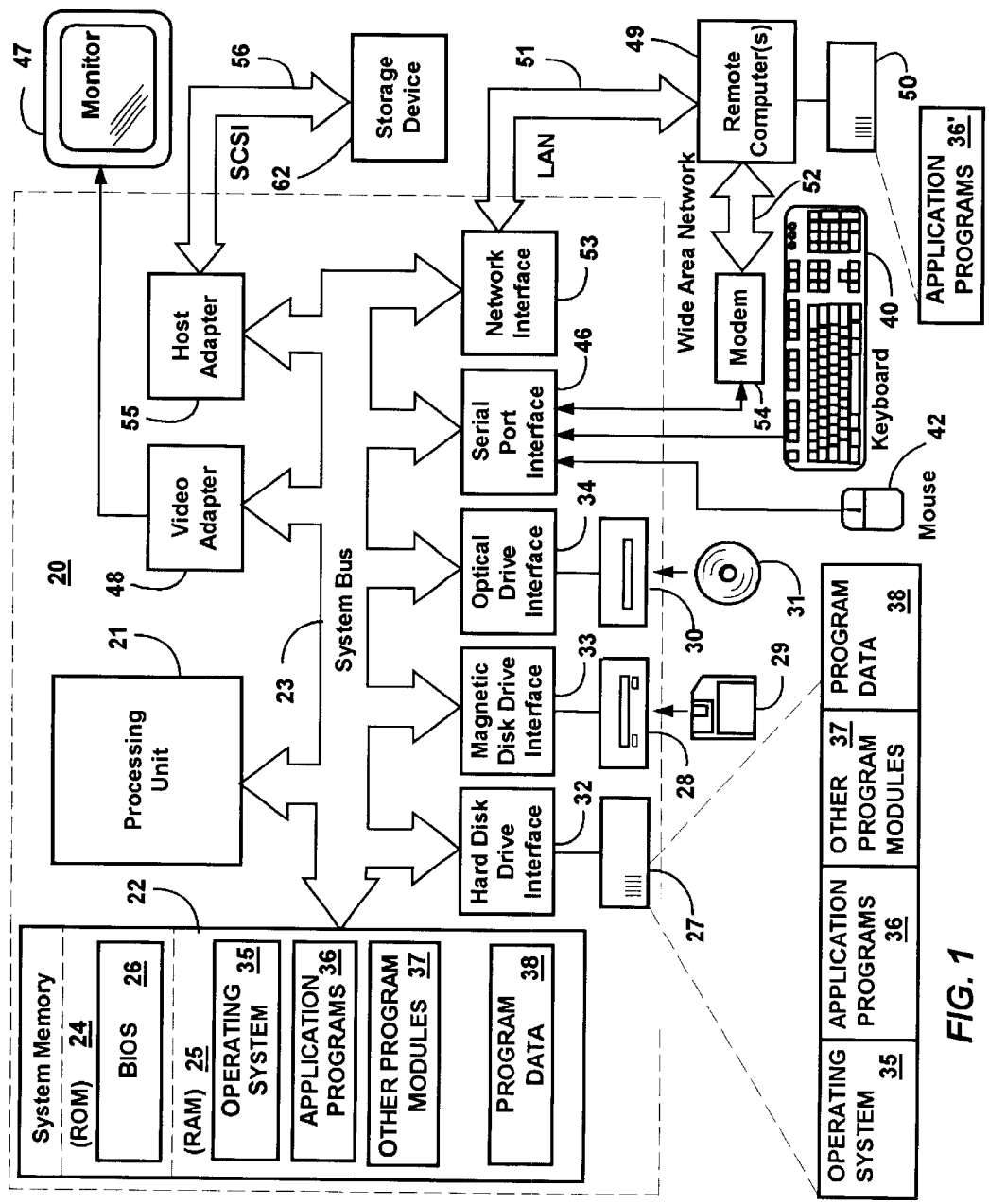
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a system (node) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2A:
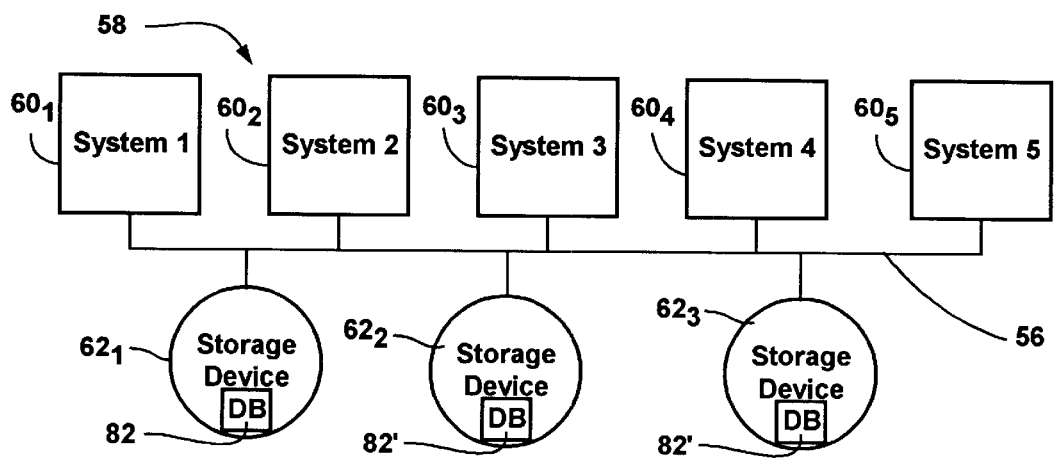
FIGS. 2A–2B are block diagrams representing a server cluster over time, with a full set of systems in the cluster and a minority of surviving systems representing the cluster, respectively.

The preferred system 20 further includes a host adapter 55 or the like which connects the system bus 23 to a SCSI (Small Computer Standard Interface) bus 56 for communicating with at least one persistent memory storage device 62. Of course, other ways of connecting cluster systems to a storage device, including Fibre Channel, are equivalent. In any event, as shown in FIG. 2A, the computer system 20 may comprise the system $60_1$, while one of the remote computers 49 may be similarly connected to the SCSI bus 56 and comprise the system $60_2$. Note that multiple storage devices (e.g. $62_1$–$62_3$) may be connected to the SCSI bus 56 (or the like) such as for purposes of resilience to disk failure through the use of multiple disks, i.e., software and/or hardware-based redundant arrays of inexpensive or independent disks (RAID).

A system administrator creates a new cluster by running a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

To accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself.

Cluster Service Components

Figure 3:
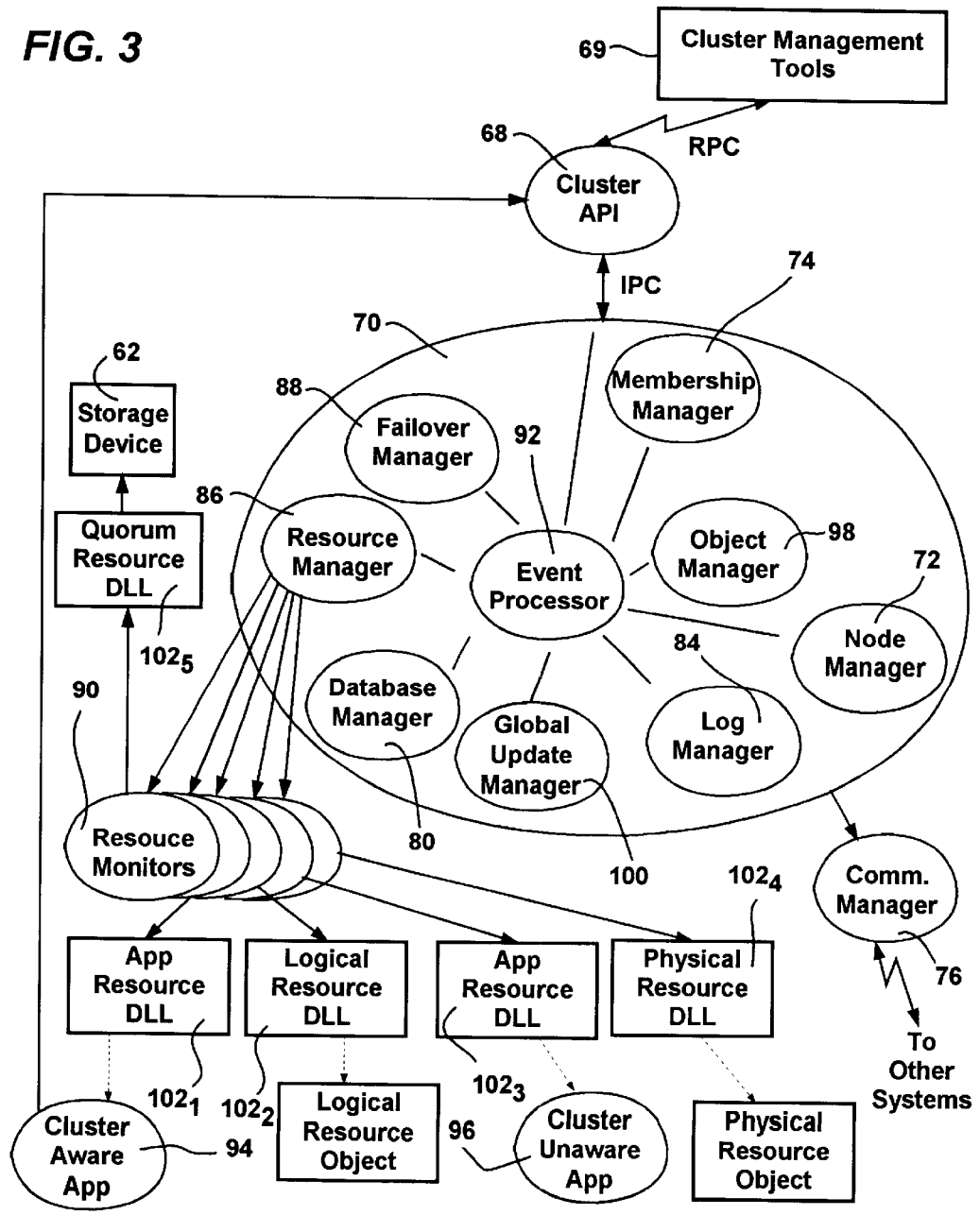
FIG. 3 is a representation of various components within the clustering service of a system for implementing the present invention.

FIG. 3 provides a representation of the cluster service components and their general relationships in a single system (e.g., $60_1$) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with all other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is in constant communication with the other systems of the cluster. In a small cluster, communication is fully connected, i.e., all systems of the cluster 58 are in direct communication with all other systems.

Systems (e.g., $60_1$–$60_5$) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database Manager 80 which implements the functions that maintain a cluster configuration database on a local device such as a disk and/or memory, and a configuration database 82 on the common persistent storage devices, (e.g., storage device $62_1$). The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. Global updates are used to ensure the consistency of the cluster database in all systems. The configuration database manager 80 also provides an interface to the configuration database 82 for use by the other cluster service 70 components. A logging manager 84 provides a facility that works with the database manager 80 to maintain cluster state information across a temporal partition.

A resource manager 86 and failover manager 88 make resource/group management decisions and initiate appropriate actions, such as startup, restart and failover. As described in more detail below, the resource manager 86 and failover manager 88 are responsible for stopping and starting the system's resources, managing resource dependencies, and for initiating failover of groups. A group is a collection of resources organized to allow an administrator to combine resources into larger logical units and manage them as a unit. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Group operations performed on a group affect all resources contained within that group. Dependency trees are described in the co-pending United States Patent Application entitled "Method and System for Resource Monitoring of Disparate Resources in a Server Cluster," invented by the inventors of the present invention, assigned to the same assignee and filed concurrently herewith.

The resource manager 86 and failover manager 88 components receive resource and system state information from at least one resource monitor 90 and the node manager 72, for example, to make decisions about groups. The failover manager 88 is responsible for deciding which systems in the cluster should "own" which groups. Those systems that own individual Groups turn control of the resources within the group over to their respective resource managers 86. When failures of resources within a group cannot be handled by the owning system, then the failover manager 80 in the cluster service 70 re-arbitrates with other failover managers in the cluster 58 for ownership of the Group.

An event processor 92 connects all of the components of the cluster service 70 and handles common operations. The event processor 92 propagates events to and from applications (e.g., 94 and 96) and to and from the components within the cluster service 70, and also performs miscellaneous services such as delivering signal events to cluster-aware applications 94. The event processor 92, in conjunction with an object manager 98, also maintains various cluster objects. A global update manager 100 operates to provide a global update service that is used by other components within the Cluster Service 70.

A resource monitor 90 runs in one or more processes that may be part of the cluster service 70, but are shown herein as being separate from the cluster service 70 and communicating therewith via Remote Procedure Calls (RPC). The resource monitor 90 monitors the health of one or more resources (e.g., $102_1$–$102_5$) via callbacks thereto. The monitoring and general operation of resources is described in more detail in co-pending United States Patent Application entitled "Method and System for Resource Monitoring of Disparate Resources in a Server Cluster," invented by the inventors of the present invention, assigned to the same assignee and filed concurrently herewith.

The resources (e.g., $102_1$–$102_5$) are implemented as one or more Dynamically Linked Libraries (DLLs) loaded into the address space of the Resource Monitor 102. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $102_1$–$102_5$ run in the system account and are considered privileged code. Resources $102_1$–$102_5$ may be defined to run in separate processes, created by the Cluster Service 70 when creating resources.

Resources expose interfaces and properties to the cluster service 70, and may depend on other resources, with no circular dependencies allowed. If a resource does depend on other resources, the resource is brought online after the resources on which it depends are already online, and is taken offline before those resources. Moreover, each resource has an associated list of systems in the cluster on which this resource may execute. For example, a disk resource may only be hosted on systems that are physically connected to the disk. Also associated with each resource is a local restart policy, defining the desired action in the event that the resource cannot continue on the current system.

Systems in the cluster must maintain a consistent view of time. One of the systems, known as the time source and selected by the administrator, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The event processor calls the node manager 72 to begin the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the database in the arriving node is examined, and if it is out of date, it is sent an updated copy. The joining system uses this shared database to find shared resources and to bring them online as needed, and also to find other cluster members.

If a cluster is not found during the discovery process, a system will attempt to form its own cluster. In accordance with one aspect of the present invention and as described in more detail below, to form a cluster, the system gains exclusive access to a quorum resource (quorum device). In general, the quorum resource is used as a tie-breaker when booting a cluster and also to protect against more than one node forming its own cluster if communication fails in a multiple node cluster. The quorum resource is a special resource, often (but not necessarily) a disk that maintains the state of the cluster, which a node arbitrates for and needs possession of before it can form a cluster. Arbitration and exclusive possession of the quorum resource are described in detail below.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster. Groups can be failed over or moved from one system to another as atomic units. Each group has a cluster-wide policy associated therewith comprising an ordered list of owners. A group fails over to systems in the listed order.

For example, if a resource fails, the resource manager 86 may choose to restart the resource, or to take the resource offline along with any resources dependent thereon. If the resource manager 86 takes the resource offline, the resource manager 86 indicates to the failover manager 88 that the group should be restarted on another system in the cluster, known as pushing the group to another system. A cluster administrator may also manually initiate such a group transfer. Both situations are similar, except that resources are gracefully shutdown for a manually initiated failover, while they are forcefully shut down in the failure case.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 88 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when the failback occurs.

The Quorum Resource

In accordance with one aspect of the present invention, the state of the cluster (including the cluster configuration information) is maintained in at least one persistent storage device (e.g., $62_1$ of FIG. 2A), such as in the database 82. Rather than require that a majority of systems be communicating before the cluster 58 can continue, the cluster 58 will continue in any member set if that member set has exclusive ownership over a majority of the storage devices that persist the state. In other words, these storage devices may be considered as having the vote which determines quorum, and are alternatively referred to as quorum resources. As a result, a minority of systems can own a majority of quorum resources and thus operate as the cluster. As a result, the cluster can operate even when a majority of its servers are down.

Figure 2B:
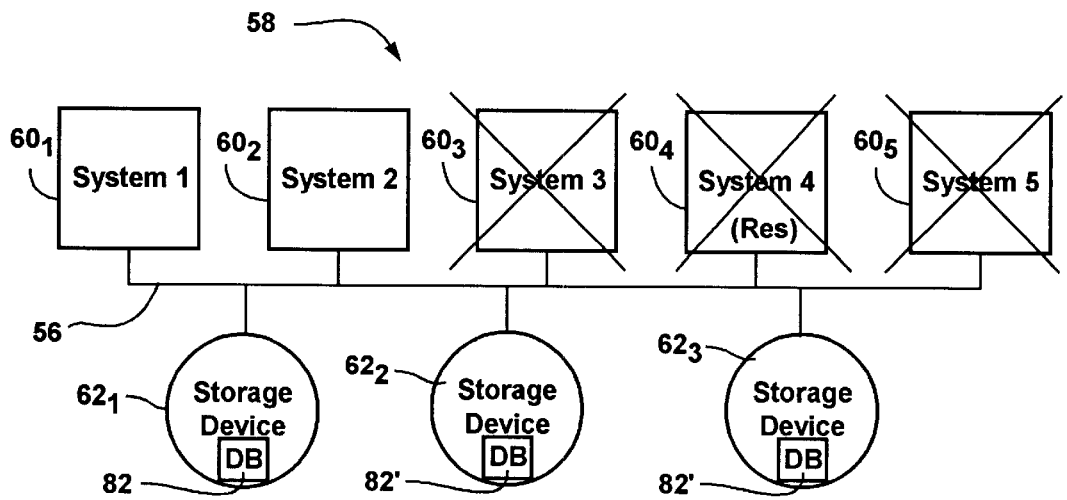

By way of example, FIG. 2A shows an exemplary cluster 58 comprising five systems $60_1$–$60_5$ and three replicated storage devices $62_1$–$62_3$ connected on the SCSI bus 56. As represented in FIG. 2B, three of the systems (e.g., $60_3$, $60_4$ and $60_5$) fail and stop communicating with systems $60_1$ and $60_2$. However, because the quorum resources $62_1$–$62_3$ are used to represent the majority member, systems $60_1$ and $60_2$ continue to operate as a cluster if the systems $60_1$ and $60_2$ can get control over a majority (any two or all three) of the quorum resources $62_1$–$62_3$. To this end, the present invention further provides an arbitration process which allows partitioned systems to challenge for exclusive ownership of a quorum resource against systems in another member set. The arbitration process for obtaining control over quorum resources is discussed below.

Quorum Resource Arbitration

For obtaining control over a quorum resource, the arbitration process of the present invention leverages the SCSI command set in order for systems to exclusively reserve the SCSI quorum resource and break another system's reservation thereof. The SCSI reserve and release commands provide the mutual exclusion mechanism, while the preferred mechanism for breaking a reservation is the SCSI bus reset. As will be understood, other standards and mechanisms may be used instead of those described herein, provided some mutual exclusion and breakage mechanism or the like are available. For example, the SCSI bus device reset or powerfail commands may be used to break a reservation, although the software will have to work in conjunction with hardware to cause a powerfail.

Figure 4A:
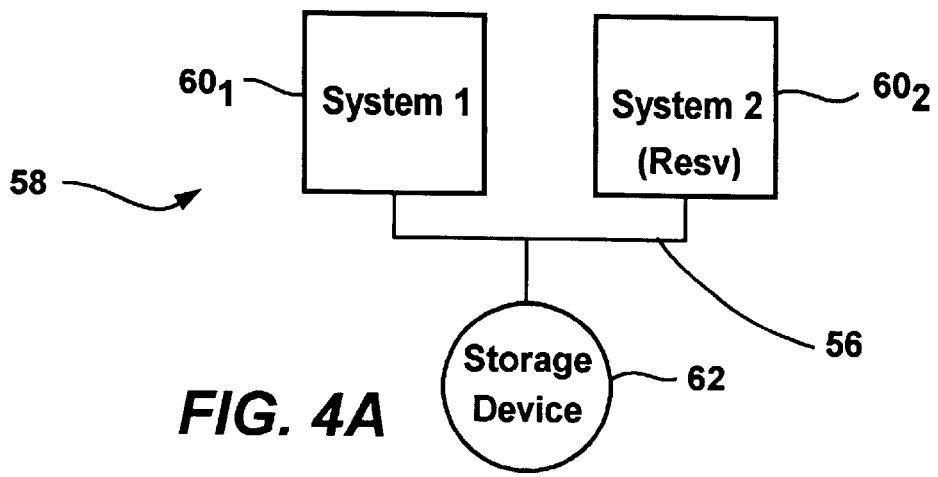
FIGS. 4A–4C are representations of a cluster wherein a change to the representation of the cluster takes place over time.
Figure 4B:
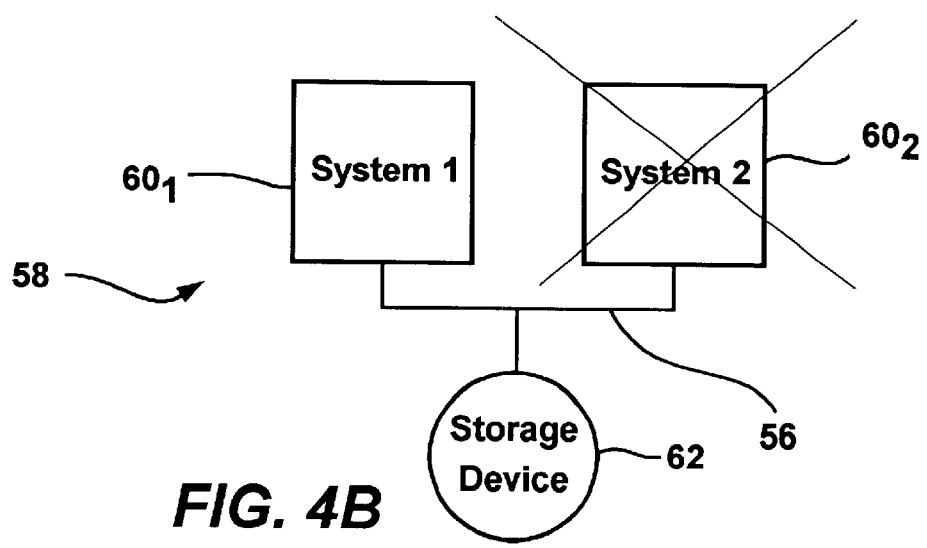
Figure 4C:
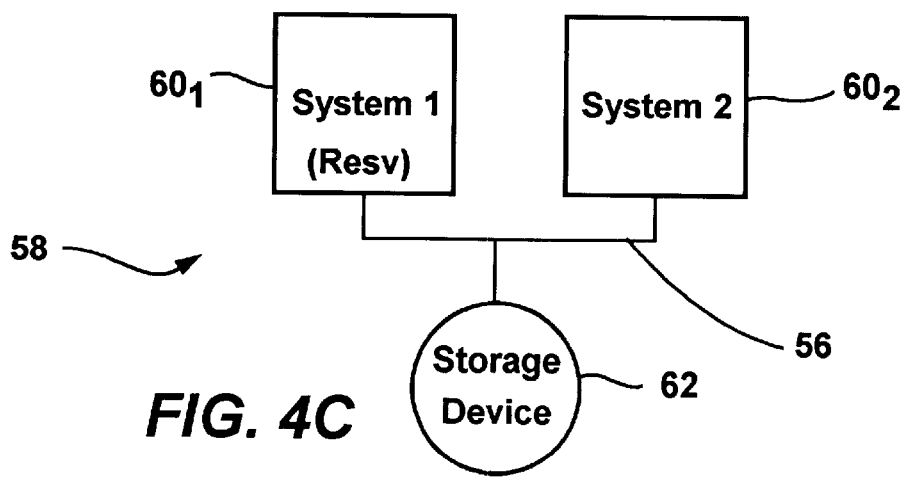
Figure 5:
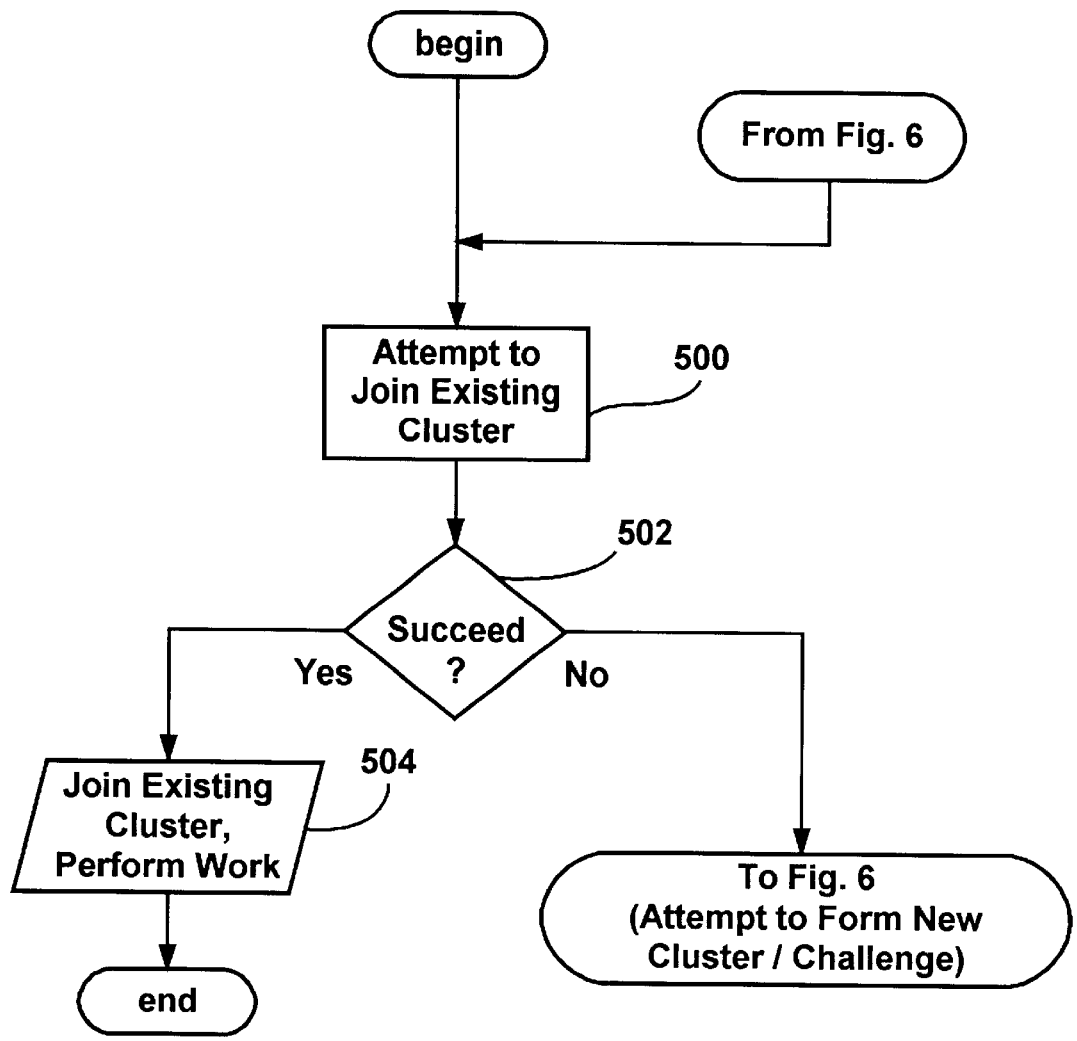
FIG. 5 is a flow diagram representing the initial steps taken by a system that is not communicating with the cluster.
Figure 6:
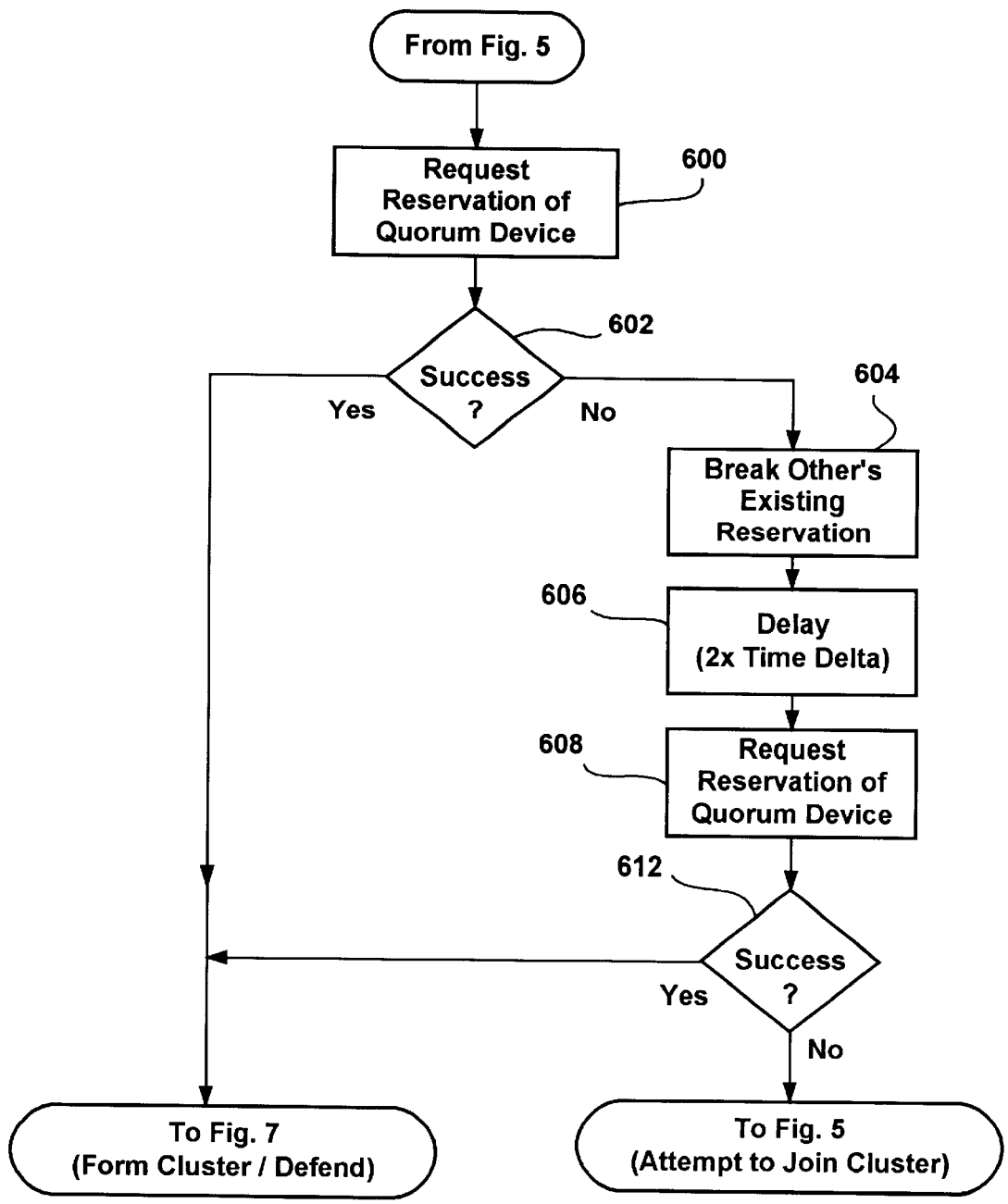
FIG. 6 is a flow diagram representing a challenge taken by a system that is not communicating with the cluster in an attempt to represent the cluster.
Figure 7:
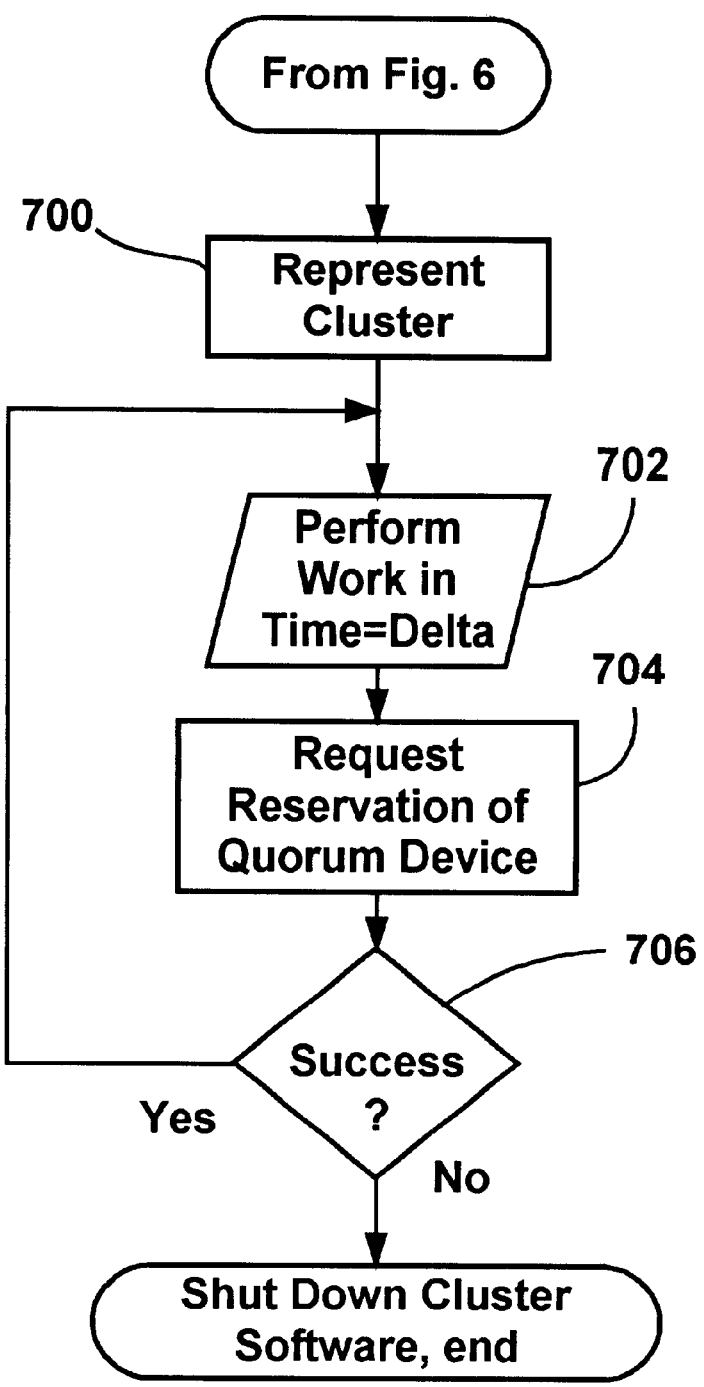
FIG. 7 is a flow diagram representing steps taken by a system representing the cluster to defend the representation of the cluster.

Turning to an explanation of the operation of the arbitration process of the present invention, FIGS. 5–7 comprise a flow diagram showing the general steps taken to arbitrate for which cluster member set should represent the cluster 58. For purposes of simplicity, the following example is described in the context of FIGS. 4A–4c, i.e., with a cluster having two systems $60_1$ and $60_2$ and one quorum resource 62 connected together on the SCSI bus 56. However, as can be appreciated, the algorithm can be extended to other permutations of member sets and resources.

In general, the arbitration process begins on each system $60_1$ and $60_2$ whenever that system is not part of the cluster 58. This may occur when a system first starts up, including when there is no cluster yet established because of a simultaneous startup of the cluster's systems. A system may also not be part of a cluster 58 when that system (which does not have ownership of the quorum resource 62) becomes partitioned from the cluster 58, such as when heartbeats are no longer detected in the other system that does have ownership of the quorum resource 62. For example, the communication link may be broken, or the system in possession of the quorum resource 62 may have crashed.

Thus, the steps of FIG. 5 are executed by each system that is not communicating with the cluster. Beginning at step 500, the partitioned system first assumes that the cluster 58 is operational and attempts to join the existing cluster (as described above). If successful, as represented by step 502, the system will simply join the existing cluster at step 504 and begin performing work as specified by a system administrator or the like. However, if not successful, the arbitration process branches to the steps of FIG. 6 wherein the partitioned system will attempt to form a new cluster by challenging for control of the quorum resource 58.

By way of example, in FIG. 4A, the system $60_1$ is a member of a cluster 58 along with system $60_2$. System $60_2$ has exclusively reserved the quorum resource 62 for itself as indicated by the parenthetical "(Resv)" in FIG. 2A. However, if the system $60_2$ crashes as represented in FIG. 2B (or otherwise stops communicating with the system $60_1$), the system $60_1$ will challenge to try and obtain ownership of the quorum resource 62 and thus continue the cluster 58.

Thus, in accordance with one aspect of the present invention and as represented by step 600, after failing to join an existing cluster, the system $60_1$ first attempts to form a new cluster by exclusively reserving the quorum resource 62. As described above, with a SCSI bus 56, this is accomplished by issuing a SCSI reserve command. A first possible outcome to the reserve command (as represented by step 602) is that the reservation request will immediately succeed because the quorum resource 62 is not exclusively reserved. This ordinarily occurs when no cluster yet exists, such as when no other systems are running or have reached the same point in time following a restart or after being similarly partitioned. For example, if the system $60_1$ is the first to attempt to reserve the storage device 62, the reservation succeeds. As a result, the system $60_1$ receives exclusive ownership of the quorum resource 62 and thus represents the cluster 58, whereby its arbitration process branches to FIG. 7, described in more detail below.

However, the other possible outcome is that the reservation request of step 600 will fail at step 602 because another system (e.g., $60_2$) has previously placed (and not released) a reservation on the quorum resource 62. However, as shown in FIG. 4B, there is a possibility that the other system $60_2$ that has exclusive control of the quorum resource 62 has stopped functioning properly, and consequently has left the quorum resource 62 in a reserved (locked) state. Note that the systems $60_1$ and $60_2$ are not communicating, and thus there is no way for system $60_1$ to know the cause of the partition, e.g., whether the other system $60_2$ has crashed or whether the system $60_1$ itself has become isolated from the cluster 58 due to a communication break. Thus, in accordance with another aspect of the present invention, the arbitration process includes a challenge-defense protocol to the ownership of the quorum resource 62 that can shift the cluster from a failed system $60_2$ to another system $60_1$ that is operational.

To accomplish the challenge portion of the process, at step 604, the challenging system $60_1$ first uses the SCSI bus reset command to break the existing reservation of the quorum resource 62 held by the other system $60_2$. This is performed because the other system $60_2$ may have crashed, leaving the quorum resource locked in an exclusively reserved state. Then, at step 606, the challenging system $60_1$ delays for a time interval equal to at least two times a predetermined delta value. During this two-delta time delay, the system $60_2$ that held exclusive possession of the quorum resource 62 (and is thus representing the cluster) is given an opportunity to persist its reservation. The persisting of a reservation is described below with reference to FIG. 7.

After breaking the existing reservation and delaying (steps 604–606), the challenging system $60_1$ executes step 608 to again request reservation of the quorum resource 62. If the request again fails, this time as tested at step 612, then the other system $60_2$ successfully defended against the challenge by properly persisting its reservation of the quorum resource 62. In such an event, the cluster 58 remains represented by the system $60_2$, and the challenging system $60_1$ returns to step 600 where it again attempts to rejoin the existing cluster 58.

However, if the other system $60_2$ crashed, it will be unable to persist its reservation within the two-delta time interval. As a result, the challenge will succeed at step 612 and the process will branch to FIG. 7, wherein at step 700 the challenging system $60_1$ will have won exclusive control over the quorum resource 62 and will thus represent the cluster 58. While representing the cluster 58, the system will perform work as needed (step 702), and will also regularly persist its reservation, i.e., defend its ownership of the quorum resource 62 against other challenging systems. Accordingly, the system $60_1$ periodically persists its reservation at step 704 by placing a SCSI reservation request for the quorum resource 62 within a time interval equal to one times delta. This allows an operational defending system enough time to replace a reservation at least once. Because systems that are not communicating cannot exchange system time information, the delta time interval is a fixed, universal time interval previously known to the systems in the cluster, at present about three seconds.

Thus, for example, if the system $60_1$ properly persists its reservation at step 704, then when the other system $60_2$ is again operational and runs its arbitration process, the system $60_2$ will fail in its challenge. Accordingly, the system $60_2$ will attempt to rejoin the cluster, and if successful, the cluster 58 will appear as in FIG. 4C, with system $60_1$ having the exclusive reservation of the quorum resource 62 as indicated by the "Resv" parenthetical.

Note that if a defending system is operating very slowly, (sometimes known as a comatose system), the defending system will be operational but will be unable to defend its reservation within the two-delta time interval. If this occurs, then the reservation will shift to a challenging system and the reservation attempt at step 704 will fail as determined at step 706. In such an event, the system will shut down its cluster software (if possible) and end.

Note that an added benefit to using the SCSI reservation mechanism is that if another system malfunctions and attempts to access the quorum resource 62 while it is reserved to another system, the access will fail. This helps prevent against data corruption caused by write operations, as there are very few times that the quorum resource will not be exclusively reserved by a system (i.e., only when a partition exists and the reservation has been broken but not yet persisted or shifted).

Lastly, as can be appreciated, the arbitration process resolves a temporal partition because it allows any one system to form a cluster 58, i.e., the system that first reserves the quorum resource 62. Other systems then join that system to add to the cluster 58.

As can be seen from the foregoing detailed description, there is provided an improved method and system for determining which member set of a partitioned cluster should survive to represent the cluster. The system and method allows a minority of a partitioned cluster's systems to survive and operate as the cluster. An arbitration method and system is provided that enables partitioned systems, including those in minority member sets, to challenge for representation of the cluster, and enables the automatic switching of cluster representation from a failed system to an operational system. The method and system allow a single system to form a quorum upon restart from a temporal partition, and is flexible, extensible and provides for a straightforward implementation into server clusters.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. A method of determining which of a plurality of nodes represents a server cluster, comprising:

providing a quorum resource that consistently maintains cluster state data;

reserving the quorum resource for exclusive access by a first node of the plurality, exclusive access to the quorum resource providing consistent cluster state data and establishing representation of the cluster independent of the number of nodes in the plurality;

defending the exclusive access of the first node to the quorum resource on a regular basis while the first node is operational; and invoking an arbitration process at the second node to challenge for exclusive access to the quorum resource, the arbitration process enabling the second node to reserve exclusive access to the quorum resource when the first node is non-operational and thereby take over representation of the cluster with consistent cluster state data.

2. The method of claim 1 wherein the quorum resource is connected to the nodes by a SCSI protocol, and wherein reserving the quorum resource by the first node includes issuing a SCSI reserve command.

3. The method of claim 1 wherein the arbitration process is invoked at the second node in response to detecting that the first node is partitioned therefrom.

4. The method of claim 3 wherein the first node is in a first set of nodes that is partitioned from at least one other set of nodes including a second set that includes the second node.

5. The method of claim 4 wherein the first set of nodes does not comprise a majority of nodes available to the cluster.

6. The method of claim 1 wherein the quorum resource comprises a plurality of persistent storage devices, and wherein providing the quorum resource includes, determining which node has exclusively reserved a majority of the storage devices, and selecting those devices as the quorum resource.

7. The method of claim 1 wherein the quorum resource comprises a persistent storage device, and wherein the consistent cluster state data includes cluster configuration information.

8. The method of claim 1 wherein when the first node is operational, the arbitration process enables the first node to persist exclusive access to the quorum resource and prevent the second node from reserving the quorum resource.

9. The method of claim 1 wherein the arbitration process breaks the reservation of the quorum resource by the first node.

10. The method of claim 9 wherein the arbitration process breaks the reservation via a SCSI bus reset command.

11. The method of claim 9 wherein the arbitration process breaks the reservation via a SCSI bus device reset command.

12. The method of claim 1 further comprising, attempting to persist the exclusive reservation of the quorum resource at the first node, and if the attempt is unsuccessful, shutting down the first node.

13. The method of claim 1 further comprising, attempting to persist the exclusive reservation of the quorum resource at the first node, and if the attempt is unsuccessful, attempting to join an existing cluster.

14. The method of claim 1 wherein the second node reserves exclusive access of the quorum resource.

15. The method of claim 14 further comprising shutting down the first node.

16. The method of claim 1 wherein the second node reserves the quorum resource by issuing a SCSI reserve command.

17. A computer-readable medium including computer-executable instructions for performing the method of claim 1.

18. In a clustering environment comprising a plurality of server nodes, a system for establishing which node represents a server cluster, comprising:
 a quorum resource that consistently maintains cluster state data, wherein exclusive access to the quorum resource by a node establishes that node as representing the server cluster independent of the number of nodes in the plurality,
 a reservation mechanism configured to give exclusive access to the quorum resource to only one node at a time; and
 an arbitration mechanism configured to enable a first node having exclusive access to the quorum resource to defend the exclusive access from a challenge by a second node when the first node is operational, and further configured to enable the second node to use the reservation mechanism to obtain exclusive access to the quorum resource when the first node is non-operational such that the second node takes over representation of the cluster with consistent cluster state data.

19. The system of claim 18 wherein the first node regularly invokes the arbitration mechanism to defend the exclusive access while the first node is operational, and wherein the second node invokes the arbitration mechanism after detecting that the second node is not communicating with the first node.

20. The system of claim 18 wherein the quorum resource is connected to each set of nodes by a SCSI protocol, and wherein the reservation mechanism configured to give exclusive access includes means for issuing a SCSI reserve command.

21. The method of claim 18 wherein the first node is in a first set of nodes that is partitioned from at least one other set of nodes including a second set that includes the second node.

22. The method of claim 21 wherein the first set of nodes does not comprise a majority of nodes available to the cluster.

23. The system of claim 18 wherein the second node invokes the arbitration mechanism to break a reservation of the quorum resource by the first node.

24. The system of claim 23 wherein the arbitration mechanism breaks the reservation via a SCSI bus reset command.

25. The system of claim 23 wherein the arbitration mechanism breaks the reservation via a SCSI bus device reset command.

26. The system of claim 18 wherein the quorum resource comprises at least one persistent storage device.

27. In a system of server nodes partitioned into at least first and second node sets, each set comprising one or more nodes, with each node in a set being able to communicate with any other node in its set but being unable to communicate with any node of another set, a method of determining whether the first set of nodes can operate as a server cluster, comprising:
 providing a quorum resource that consistently maintains cluster state data, the quorum resource exclusively accessed by only one node at a time;
 requesting, in a first request, exclusive access to the quorum resource by one node of the first set; and
 if the first request is successful, allowing the first set of nodes to operate as the cluster independent of a number of nodes in the first set relative to a number of nodes in any other node set or sets; and
 if the first request is not successful, breaking any exclusive access to the quorum resource without establishing exclusive access, delaying for a predetermined period of time to enable any other node that previously had exclusive access to re-obtain its exclusive access, and requesting, in a second request by the node of the first set following the period of time, exclusive access to the quorum resource, and if the second request is successful, allowing the first set of nodes to operate as the cluster independent of a number of nodes in the first set relative to a number of nodes in any other node set or sets.

28. The method of claim 27 wherein the node of the first set automatically makes the first request in response to detecting an inability to communicate with a node of the second set.

29. The method of claim 27 wherein the cluster state data maintained on the quorum resource includes cluster configuration information.

30. The method of claim 27 wherein the quorum resource is connected to the nodes by a SCSI protocol, and wherein the first request includes issuing a SCSI reserve command.

31. The method of claim 27 wherein the quorum resource is connected to the nodes by a SCSI protocol, and wherein breaking the exclusive access to the quorum resource includes issuing a SCSI bus reset command.

32. The method of claim 27 wherein the quorum resource is connected to the nodes by a SCSI protocol, and wherein breaking the exclusive access to the quorum resource includes issuing a SCSI bus device reset command.

33. The method of claim 27 further comprising, obtaining exclusive access to the quorum resource by the first node, and persisting the exclusive access.

34. The method of claim 33 wherein persisting the exclusive access is repeated regularly within a time interval that is less than the predetermined delay time.

35. The method of claim 27 further comprising, obtaining exclusive access to the quorum resource by the first node, making an attempt by the first node to persist its exclusive access to the quorum resource, and if the attempt is unsuccessful, shutting down the first node.

36. The method of claim 27 wherein if the second request is not successful, attempting to join an existing cluster.

37. The method of claim 27 wherein at least one of the sets of nodes has only a single node therein.

38. A computer-readable medium including computer-executable instructions for performing the method of claim 27.

39. A method of operating a server cluster, comprising:
   providing a persistent storage device as a quorum resource, the quorum resource consistently maintaining cluster state data and capable of being exclusively reserved by only one node at a time;
   reserving the quorum resource for exclusive access by a first node;
   selecting as the cluster a set of nodes that includes the first node and any nodes able to communicate with the first node, wherein selection is based on the exclusive access to the quorum resource and is independent of a number of nodes requirement; and
   defending the first node's exclusive access from a challenge by a challenging node without providing exclusive access to the quorum resource to the challenging node.

40. The method of claim 39 wherein reserving the quorum resource for exclusive access by the first node further includes invoking an arbitration process.

41. The method of claim 39 wherein the quorum resource is connected to the first node nodes by a SCSI protocol, and wherein reserving the quorum resource includes issuing a SCSI reserve command.

42. The method of claim 39 wherein the cluster state data includes cluster configuration information.

43. The method of claim 39 wherein defending the exclusive access includes persisting a reservation to the quorum resource.

44. The method of claim 39 wherein reserving the quorum resource for exclusive access by a first node includes breaking a reservation of the quorum resource by another node.

45. The method of claim 44 wherein breaking the reservation includes issuing a SCSI bus reset command.

46. The method of claim 44 wherein breaking the reservation includes issuing a SCSI bus device reset command.

47. A computer-readable medium including computer-executable instructions for performing the method of claim 39.

48. In a clustering environment, a system, comprising:
   a quorum resource configured to consistently maintain cluster state data thereon, wherein exclusive access to the quorum resource by a node determines representation of the cluster independent of a quorum of nodes requirement; and
   an arbitration mechanism, the arbitration mechanism configured to:
      1) reserve the quorum resource for exclusive access by a first node, such that the first node represents the cluster and the quorum resource has consistent cluster state data maintained thereon by the first node;
      2) enable the first node to defend its exclusive access from challenges thereto when the first node is operational; and
      3) enable a second node to challenge for exclusive access to the quorum resource, such that when the first node is not operational, the second node obtains exclusive access to the quorum resource and represents the cluster, and the quorum resource has consistent cluster state data maintained thereon by the second node.

49. The system of claim 48 wherein when operational, the first node defends its exclusive access by regularly persisting a reservation of the quorum resource.

50. The system of claim 48 wherein the arbitration mechanism enables the second node to challenge for exclusive access to the quorum resource by breaking the reservation of the quorum resource of the first node.

51. The system of claim 48 wherein the quorum resource is connected to the nodes by a SCSI protocol.

52. The system of claim 51 wherein the arbitration mechanism reserves the quorum resource by issuing a SCSI reserve command.

53. The system of claim 51 wherein the arbitration mechanism breaks a reservation of the quorum resource by issuing a SCSI bus reset command.

54. The system of claim 51 wherein the arbitration mechanism breaks a reservation of the quorum resource by issuing a SCSI bus device reset command.

55. The method of claim 48 wherein the first node is in a first set of nodes that is partitioned from at least one other set of nodes including a second set that includes the second node.

56. The method of claim 55 wherein the first set of nodes does not comprise a majority of nodes available in the clustering environment.

57. A method of determining cluster representation between a first node and a second node, comprising:
   providing a quorum resource capable of being exclusively reserved by only one node at a time, exclusive reservation thereto determining representation of the cluster independent of a total number of nodes;
   exclusively reserving the quorum resource by the first node such that the first node represents the cluster and the quorum resource has consistent cluster state data maintained thereon by the first node;
   detecting at a second node that the first node is partitioned therefrom; and
   challenging at the second node the exclusive reservation of the quorum resource by the first node; and
      if the first node is able to defend its exclusive reservation, failing the challenge, or
      if the first node is unable to defend its exclusive reservation, succeeding the challenge and exclusively reserving the quorum resource by the second node such that such that the second node represents the cluster and the quorum resource has consistent cluster state data maintained thereon by the second node.

58. The method of claim 57 wherein challenging at the second node includes breaking the exclusive reservation of the quorum resource by the first node, and providing a time period for the first node to defend its reservation.

59. The method of claim 58 wherein breaking the exclusive reservation includes issuing a SCSI bus reset command.

60. The method of claim 58 wherein breaking the exclusive reservation includes issuing a SCSI bus device reset command.

61. The method of claim 58 further comprising, defending the reservation of the quorum resource at the first node during the time period.

62. The method of claim 57 wherein the quorum resource comprises a persistent storage device, and further comprising storing cluster configuration information on the persistent storage device.

63. The method of claim 57 wherein exclusively reserving the quorum resource by the first node includes breaking a reservation of the quorum resource by another node.

64. The method of claim 63 wherein the reservation includes issuing a SCSI bus reset command.

65. The method of claim 63 wherein breaking the reservation includes issuing a SCSI bus device reset command.

66. The method of claim 57 wherein exclusively reserving the quorum resource by the first node includes issuing a SCSI reserve command.

67. The method of claim 57 wherein the first node defends its exclusive reservation of the quorum resource by issuing a SCSI reserve command.

68. The method of claim 57 wherein challenging at the second node includes breaking the reservation of the first node and attempting to reserve the quorum device at the second node.

69. The method of claim 57 wherein challenging at the second node including issuing a SCSI bus reset command and issuing a SCSI reserve command.

70. The method of claim 57 wherein challenging at the second node includes issuing a SCSI bus device reset command and issuing a SCSI reserve command.

71. A computer-readable medium including computer-executable instructions for performing the method of claim 57.

* * * * *

UNITED STATES PATENT AND TRADEMARK OFFICE
CERTIFICATE OF CORRECTION

PATENT NO. : 6,279,032 B1
DATED : August 21, 2001
INVENTOR(S) : Short et al.

It is certified that error appears in the above-identified patent and that said Letters Patent is hereby corrected as shown below:

Column 1,
Line 28, "failure" should read -- failure, --.

Column 5,
Line 11, "e.g." should read -- e.g., --.

Column 6,
Line 7, "Manager" should read -- manager --.

Column 7,
Line 55, "states," should read -- states: --.

Column 10,
Line 6, "4c" should read -- 4C --.

Column 13,
Line 47, "plurality," should read -- plurality; --.

Column 16,
Line 55, "such that such that" should read -- such that --.
Line 51, "challenge, or" should read -- challenge; or --.

Column 18,
Line 8, "including" should read -- includes --.

Signed and Sealed this

Twenty-eighth Day of December, 2004

JON W. DUDAS
*Director of the United States Patent and Trademark Office*